United States Patent
Wu et al.

(10) Patent No.: US 11,797,564 B2
(45) Date of Patent: Oct. 24, 2023

(54) SYSTEM AND METHOD FOR DATA REGISTRATION

(71) Applicant: EMC IP Holding Company LLC, Hopkinton, MA (US)

(72) Inventors: Pengfei Wu, Shanghai (CN); Assaf Natanzon, Tel Aviv (IL); Stephen James Todd, North Conway, NH (US); Zhenzhen Lin, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 431 days.

(21) Appl. No.: 16/530,936

(22) Filed: Aug. 2, 2019

(65) Prior Publication Data
US 2021/0034361 A1   Feb. 4, 2021

(51) Int. Cl.
*G06F 16/27* (2019.01)
*G06F 16/21* (2019.01)

(52) U.S. Cl.
CPC .............. *G06F 16/27* (2019.01); *G06F 16/21* (2019.01)

(58) Field of Classification Search
CPC .................................. G06F 16/27; G06F 16/21
See application file for complete search history.

(56) References Cited

U.S. PATENT DOCUMENTS

| | | | |
|---|---|---|---|
| 5,774,876 A * | 6/1998 | Woolley | G01S 13/74 705/28 |
| 10,795,857 B2 * | 10/2020 | Lin | G06F 16/1734 |
| 2005/0192008 A1 | 9/2005 | Gustafson et al. | |
| 2017/0005804 A1 | 1/2017 | Zinder | |
| 2017/0186057 A1 | 6/2017 | Metnick | |
| 2017/0230189 A1 | 8/2017 | Toll et al. | |
| 2018/0117447 A1 | 5/2018 | Tran et al. | |
| 2019/0080407 A1 | 3/2019 | Molinari et al. | |
| 2019/0140822 A1 | 5/2019 | Xie et al. | |
| 2019/0190719 A1 * | 6/2019 | van de Ruit | H04L 9/3239 |
| 2019/0251078 A1 | 8/2019 | Yan | |

(Continued)

FOREIGN PATENT DOCUMENTS

WO   2019067944 A1   4/2019

OTHER PUBLICATIONS

"Terbine Opens First Nationwide System of Public Agency IoT Data"; Terbine; Jan. 9, 2019; https://web.archive.org/web/20190109213433/https//terbine com/.

(Continued)

*Primary Examiner* — Charles D Adams
(74) *Attorney, Agent, or Firm* — Chamberlain, Hrdlicka, White, Williams & Aughtry

(57) ABSTRACT

A computing device of a data register includes persistent storage and a data register manager. The persistent storage stores: an instance of a primary chain that specifies an organizational structure of computing devices of the data register and a secondary chain for registering data with a first portion of the computing devices. The data register manager monitors sizes of each of the portions of the computing devices specified by the organizational structure; makes a determination, based on the monitoring, that the organizational structure fails to meet at least one criteria; and in response to the determination: reorganizes the organizational structure to meet the at least one criteria by, at least in part, modifying the secondary chain.

10 Claims, 20 Drawing Sheets

(56) References Cited

U.S. PATENT DOCUMENTS

2019/0251563 A1   8/2019  Yan
2019/0361917 A1  11/2019  Tran et al.
2020/0007544 A1   1/2020  Wang et al.
2020/0184085 A1   6/2020  Korten et al.
2020/0295949 A1*  9/2020  Ding .................... H04L 9/3239

OTHER PUBLICATIONS

Henri Pihkala et al.; "Unstoppable Data for Unstoppable Apps: DATAcoin by Streamr"; Whitepaper, Version 1.0; Jul. 25, 2017.
Vincent Bultot; "DataBroker DAO new year's update by CEO & founder Matthew Van Niekerk"; Databroker—The Marketplace for Data; Jan. 10, 2019; https://databroker.online/blog/76.
Anonymous, NPL Search Terms, pp. 1, 2022.

* cited by examiner

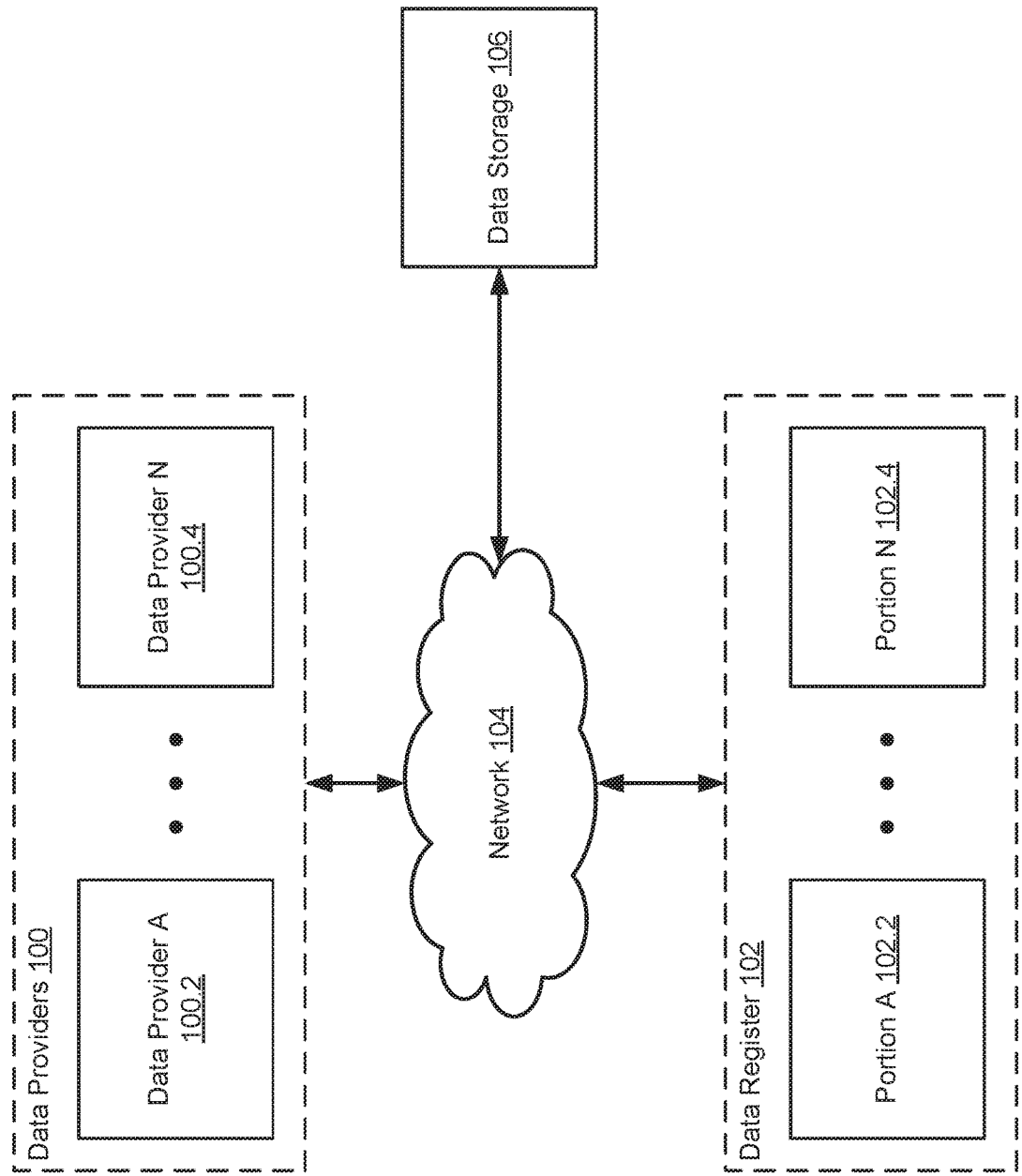
FIG. 1.1

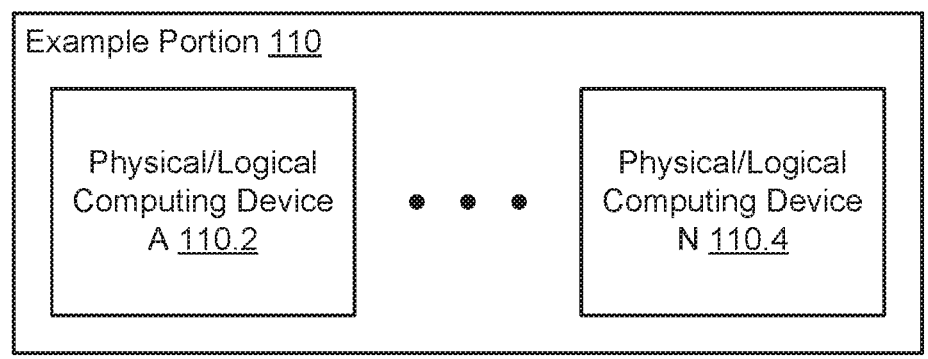
FIG. 1.2

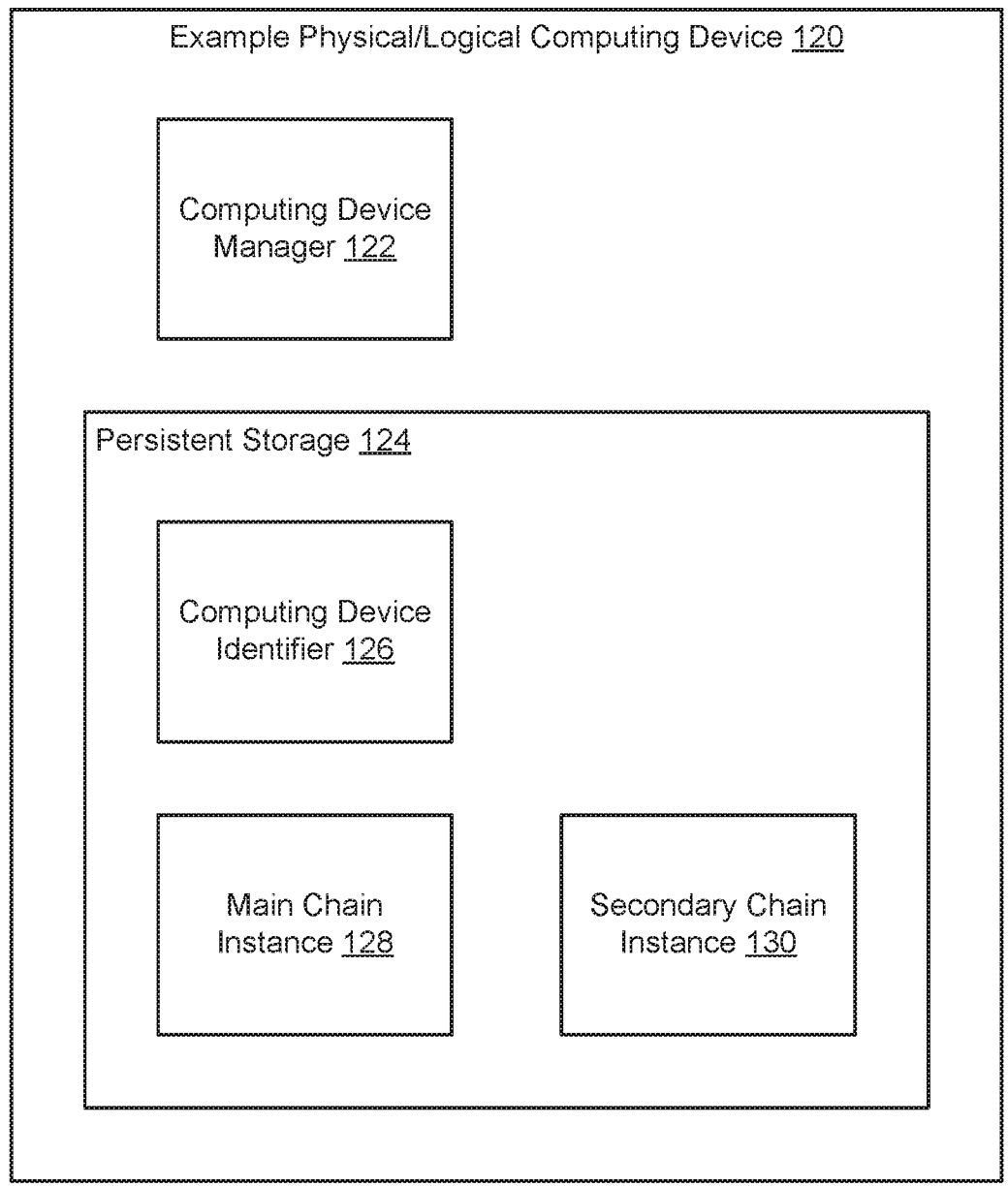
FIG. 1.3

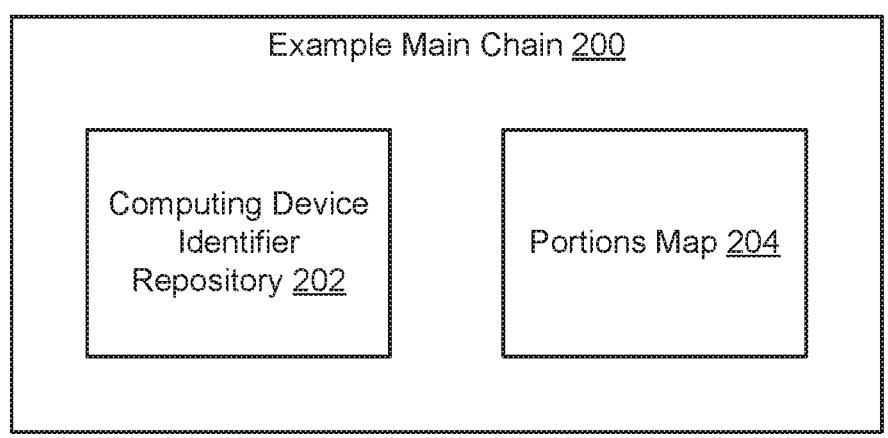
FIG. 2.1

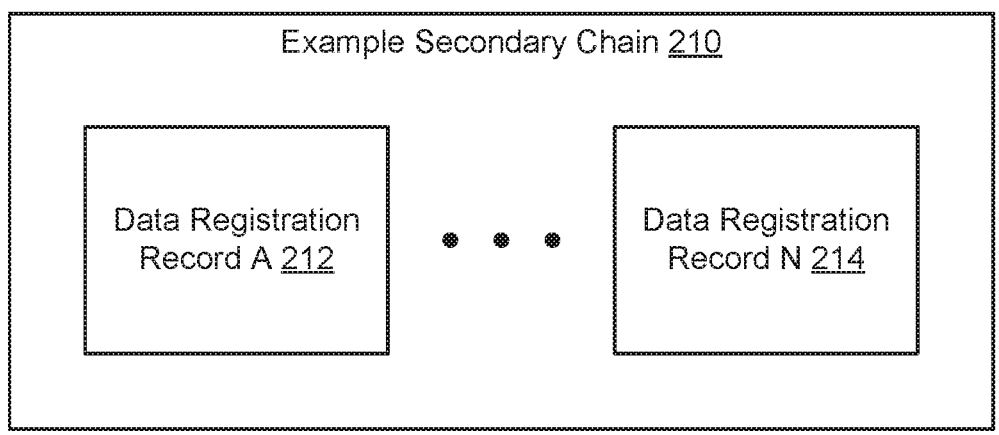
FIG. 2.2

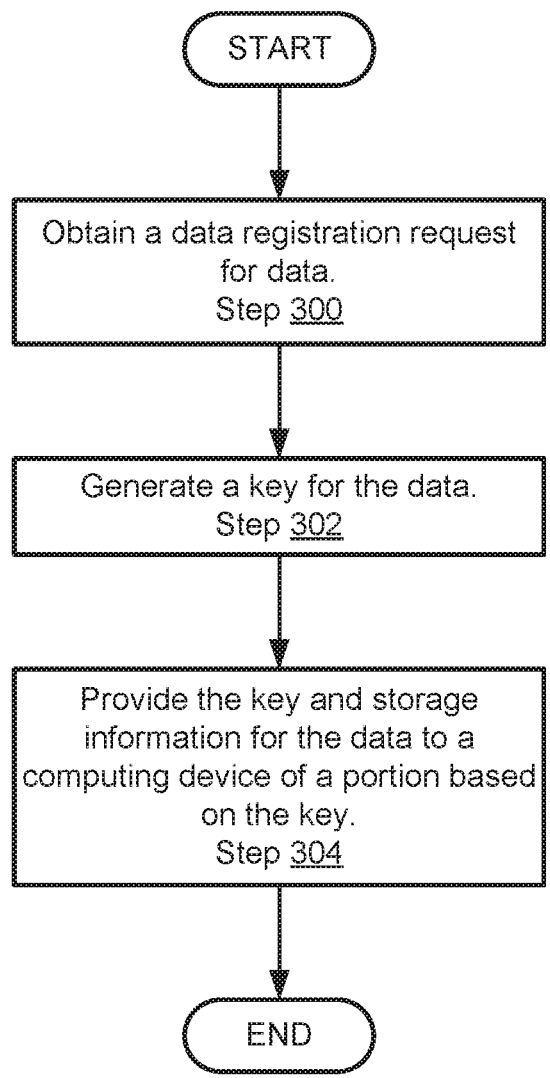
FIG. 3.1

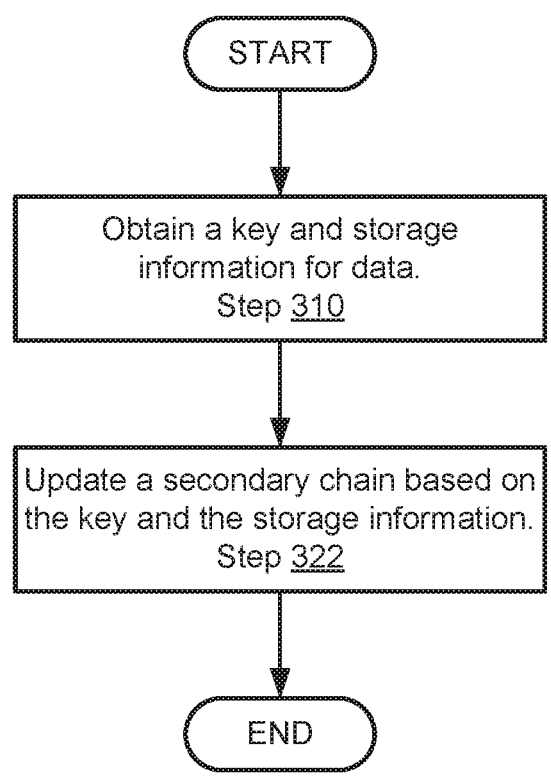
FIG. 3.2

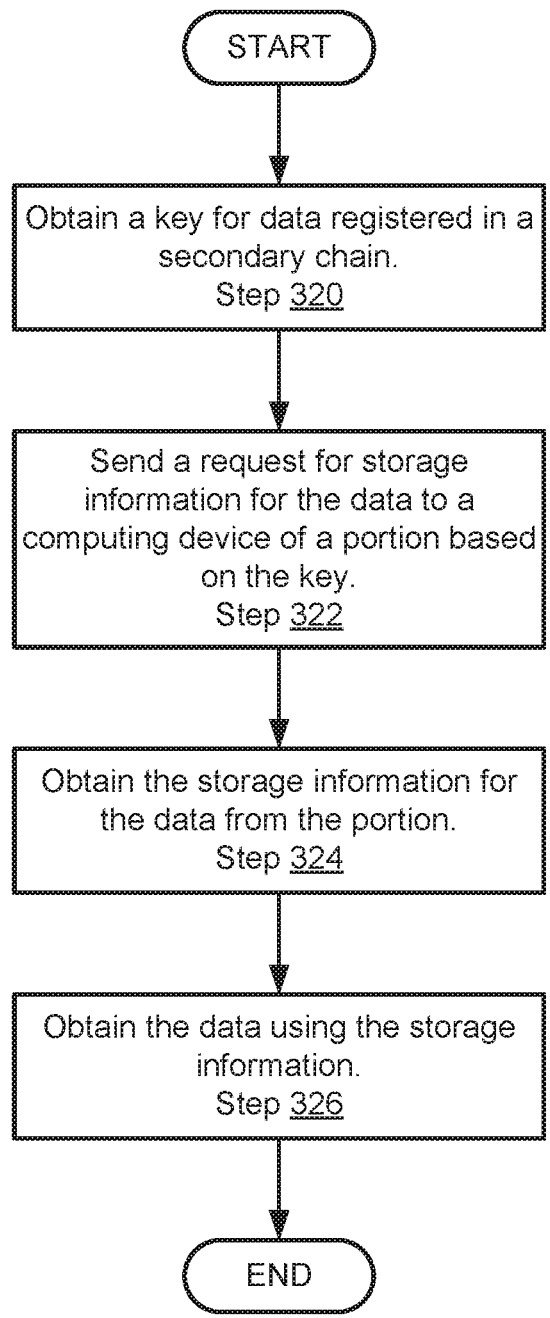
FIG. 3.3

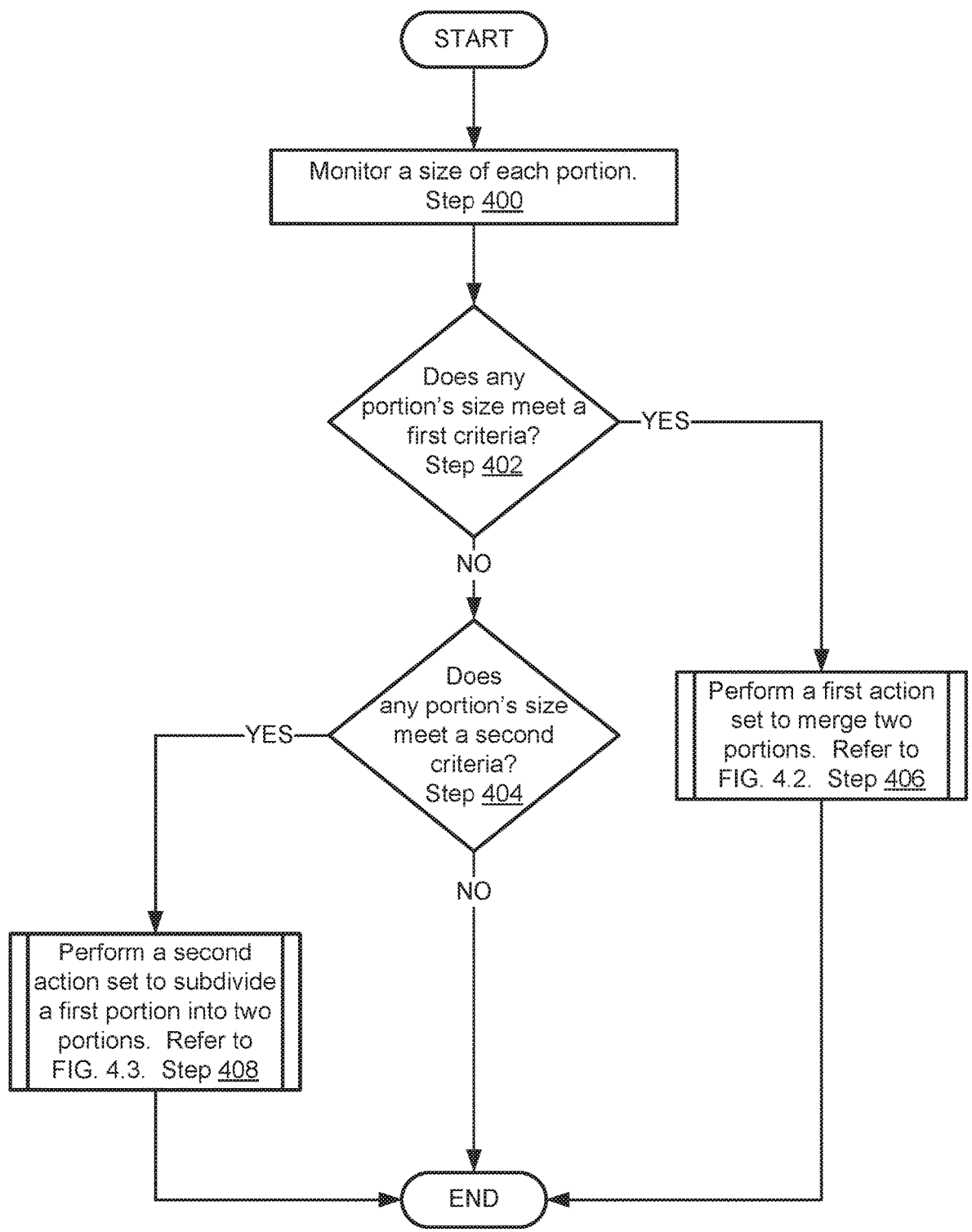
FIG. 4.1

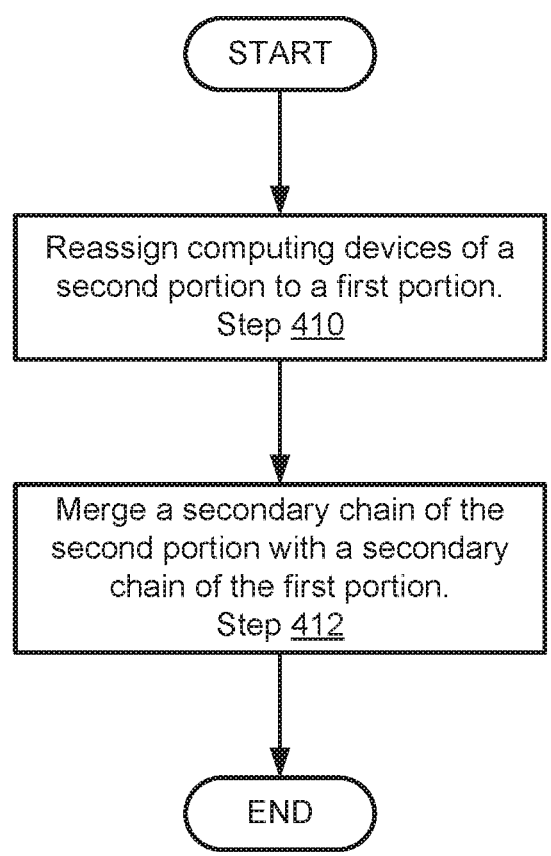
FIG. 4.2

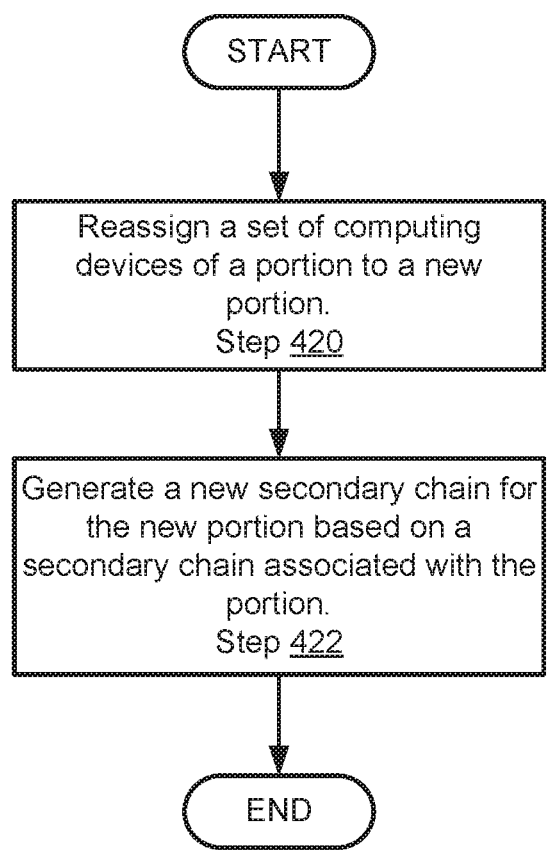
FIG. 4.3

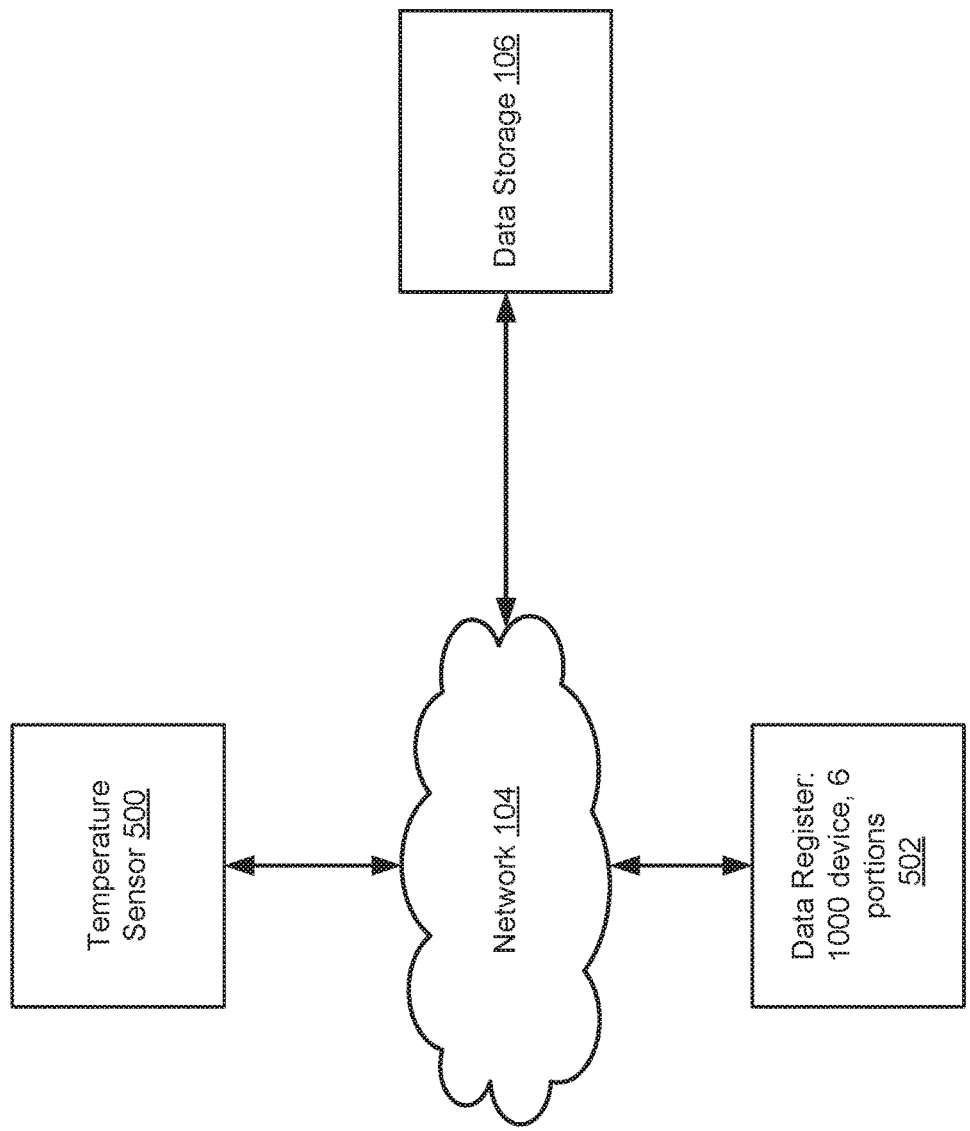

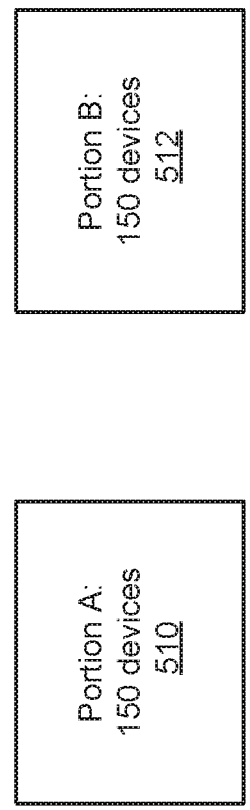
FIG. 5.2

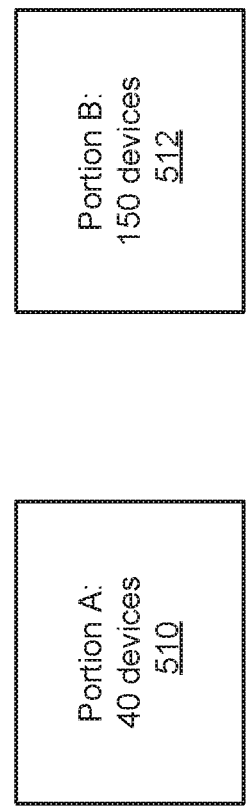
FIG. 5.3

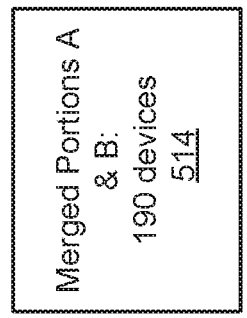
FIG. 5.4

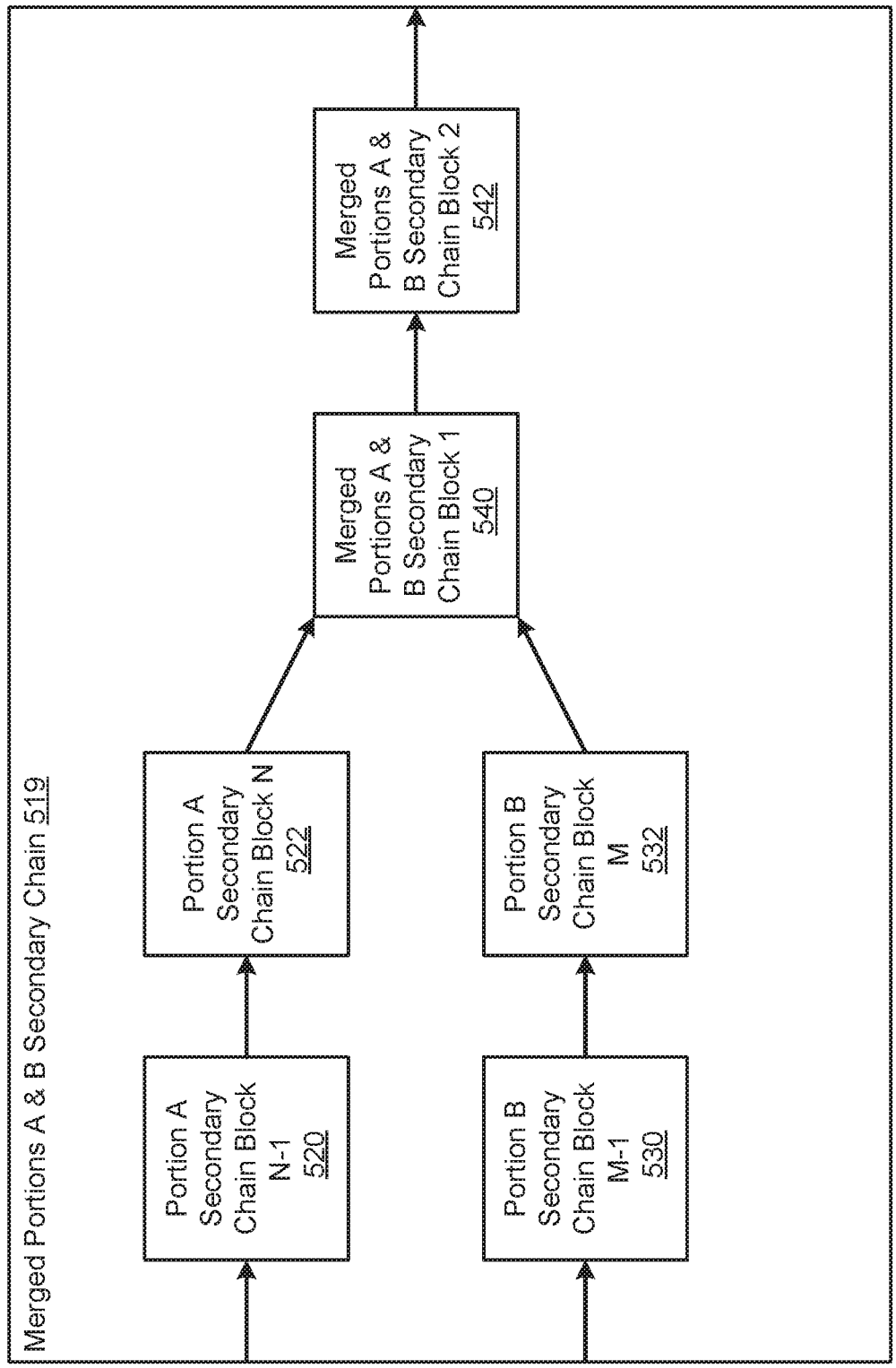
FIG. 5.5

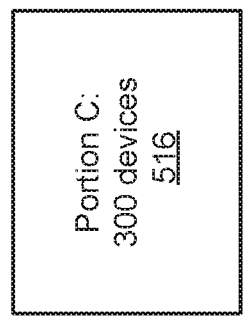
FIG. 5.6

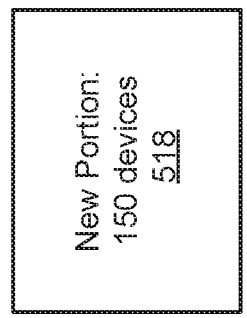
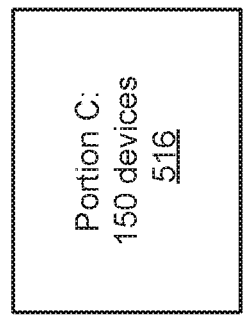
FIG. 5.7

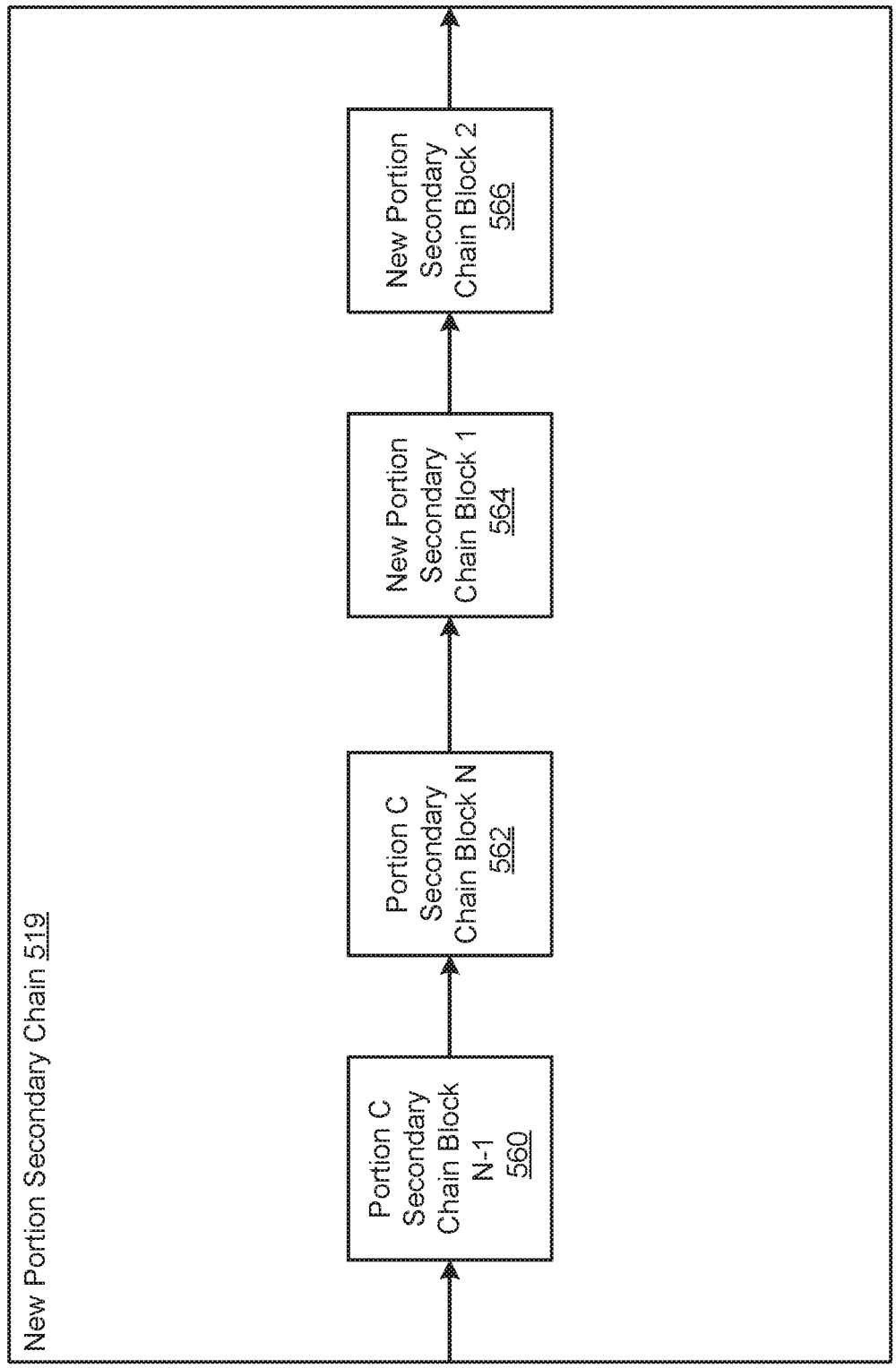
FIG. 5.8

SYSTEM AND METHOD FOR DATA REGISTRATION

BACKGROUND

Devices may generate information. When information is generated, it may need to be store for future reference. To store the information, it may be encoded as binary data stored in persistent storage. Large quantities of generated information may require large amounts of storage resources for storing the binary data.

SUMMARY

In one aspect, a computing device of a data register in accordance with one or more embodiments of the invention includes persistent storage for storing: an instance of a primary chain that specifies an organizational structure of computing devices of the data register, and a secondary chain for registering data with a first portion of the computing devices; and a data register manager that monitors sizes of each of the portions of the computing devices specified by the organizational structure; makes a determination, based on the monitoring, that the organizational structure fails to meet at least one criteria; and in response to the determination: reorganizes the organizational structure to meet the at least one criteria by, at least in part, modifying the secondary chain.

In one aspect, a method of operating a data register in accordance with one or more embodiments of the invention includes monitoring sizes of each portion of portions of computing devices of the data register specified by an organizational structure associated with the data register; making a determination, based on the monitoring, that the organizational structure fails to meet at least one criteria; and in response to the determination: reorganizing the organizational structure to meet the at least one criteria by, at least in part, modifying a secondary chain associated with a first portion of the portions.

In one aspect, a non-transitory computer readable medium in accordance with one or more embodiments of the invention includes computer readable program code, which when executed by a computer processor enables the computer processor to perform a method for operating a data register, the method includes monitoring sizes of each portion of portions of computing devices of the data register specified by an organizational structure associated with the data register; making a determination, based on the monitoring, that the organizational structure fails to meet at least one criteria; and in response to the determination: reorganizing the organizational structure to meet the at least one criteria by, at least in part, modifying a secondary chain associated with a first portion of the portions.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of an example portion of a data register in accordance with one or more embodiments of the invention.

FIG. 1.3 shows a diagram of an example physical/logical computing device in accordance with one or more embodiments of the invention.

FIG. 2.1 shows a diagram of an example main chairs accordance with one or more embodiments of the invention.

FIG. 2.2 shows a diagram of an example secondary chain in accordance with one or more embodiments of the invention.

FIG. 3.1 shows a flowchart of a method of assigning a data registration for processing in accordance with one or more embodiments of the invention.

FIG. 3.2 shows a flowchart of a method of registering data in accordance with one or more embodiments of the invention.

FIG. 3.3 shows a flowchart of a method of providing registered data in accordance with one or more embodiments of the invention.

FIG. 4.1 shows a flowchart of a method of managing devices of a data register in accordance with one or more embodiments of the invention.

FIG. 4.2 shows a flowchart of a method of merging two portions of a data register in accordance with one or more embodiments of the invention.

FIG. 4.3 shows a flowchart of a method of dividing a portion of a data register in accordance with one or more embodiments of the invention.

FIG. 5.1 shows a diagram of an example system, similar to the system of FIG. 1.1, at a first point in time.

FIG. 5.2 shows a diagram of two portions of the data register of the system of FIG. 1.1 at the first point in time.

FIG. 5.3 shows a diagram of the two portions of the data register of the system of FIG. 1.1 at a second point in time.

FIG. 5.4 shows a diagram of the two portions of the data register of the system of FIG. 1.1 after being merged.

FIG. 5.5 shows a diagram of a secondary chain of the merged secondary chains of the two portions of the data register of the system of FIG. 1.1.

FIG. 5.6 shows a diagram of a third portion of the data register of the system of FIG. 1.1 at a third point in time.

FIG. 5.7 shows a diagram of the third portion of the data register of the system of FIG. 1.1 after being divided to generate a new portion.

FIG. 5.8 shows a diagram of a secondary chain of the new portion of FIG. 5.7.

DETAILED DESCRIPTION

Figure 6:
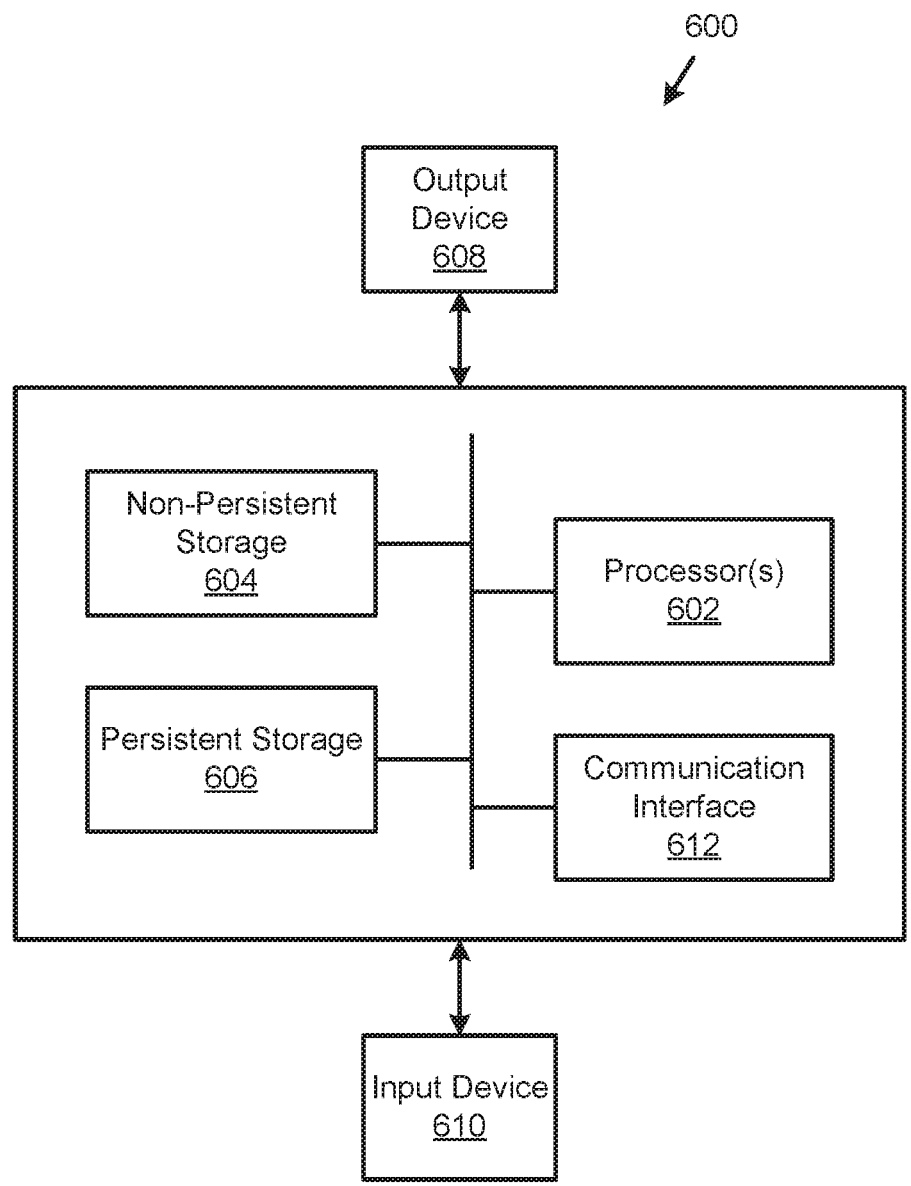
FIG. 6 shows a diagram of a computing device in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for managing data. A system in accordance with embodiments of the invention may manage data by registering it when it is stored. The data may be, for example, data streamed from devices such as Internet of Things (IOT) devices. To register the data, the system may need to be able to processes a commensurate number of registrations.

To provide a commensurate rate for registering data, embodiments of the invention may provide a system that utilizes multiple types of distributed data structures for managing the system itself and the data registrations. Specifically, embodiments of the invention may provide a bifurcated approach in which system information is stored in a first distributed data structure in which all devices of the system participate in its management. In contrast, data registrations may be stored in any number of secondary distributed data structures that are each managed by separate portions of the system. Consequently, the number of entities participating in the management of the secondary distributed data structures may be smaller than the number of entities participating in the management of the first distributed data structure. By doing so, data that is less likely to change or otherwise need to be updated may be included in the first distributed data structure while data that is more likely to change or otherwise need to be updated may be included in the second distributed data structure.

Due to the smaller number of entities involved in management of the secondary distributed data structures, the computational cost for managing each of the secondary distributed data structures may be smaller than the computational cost for managing the first distributed data structure. Consequently, the secondary distributed data structures may facilitate a high rate of registering data when compared to the potential rate for registering data using the first distributed data structure.

FIG. 1.1 shows a system in accordance with one or more embodiments of the invention. The system may include data providers (100). The data providers (100) may provide data for management by a data register (102). For example, the data providers (100) may generate data for providing to the data register (102), obtain data from other sources for providing to the data register (102), or otherwise cause data to be provided to the data register (102).

When data is provided by the data providers (100), the data may be stored in data storage (106). Once stored, the data register (102) may generate a record of the stored data in the data storage (106). By doing so, records reflecting all, or portion, of the data managed by the data register (102) may be generated, stored, and/or made available to any number of entities.

All, or a portion, of the components of the system illustrated in FIG. 1.1 may be operably connected to each other and/or other entities via any combination of wired and/or wireless connections. For example, the aforementioned components may be operably connected, at least in part, via a network (104). The network (104) may be any type of communications network and provide communication services by implementing any and/or a combination of any communication protocols. The aforementioned components of the system may be operably connected to the network (104) which, in turn, facilitates communications between the aforementioned components, other components of the system of FIG. 1.1, and/or other entities (not shown). Each component of the system of FIG. 1.1 is discussed below.

The data providers (100) may be implemented using computing devices. The computing devices may be, for example, embedded computing devices, mobile phones, tablet computers, laptop computers, desktop computers, servers, network devices, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3.1-4.3. The data providers (100) may be other types of computing devices without departing from the invention. For additional details regarding computing devices, refer to FIG. 6.

The data providers (100) may be implemented using logical devices without departing from the invention. For example, the data providers (100) may be implemented using virtual machines or other types of logical entities that utilize computing resources of any number of physical computing devices to provide the functionality of the data providers (100). The data providers (100) may be other types of logical devices without departing from the invention.

In one or more embodiments of the invention, the data providers (100) provide data. The data may be any type and/or quantity of data. The data providers (100) may obtain the data from any source (e.g., via generation, obtaining from other sources, etc.).

For example, the data may include video stream data from a camera. In another example, the data may include static images from a camera, in a still further example, the data may be obtained from an internet of things device. The data provided by the data providers (100) may include any type and/or quantity of information.

In one or more embodiments of the invention, the data providers (100) utilize the data register (102) for data management purposes. For example, the data providers (100) may store copies of data in the data storage (106), provide copies of the data to the data register (102), and/or otherwise notify the data register (102) of the intent of the data providers (100) to utilize the data management services provided by the data register (102).

There may be any number of data providers (e.g., 100.2, 100.4). For example, the system may include a single data provider (e.g., 100.2), two data providers (e.g., 100.2, 100.4), or more than two data providers (100).

The data register (102) may be implemented using computing devices. The computing devices may be, for example, embedded computing devices, mobile phones, tablet computers, laptop computers, desktop computers, servers, network devices, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3.1-4.3, The data register (102) may be other types of computing devices without departing from the invention. For additional details regarding computing devices, refer to FIG. 6.

The data register (102) may be implemented using logical devices without departing from the invention. For example, the data register (102) may be implemented as virtual machines or other types of logical entities that utilize computing resources of any number of physical computing devices to provide the functionality of the data register (102), The data register (102) may be other types of logical devices without departing from the invention.

In one or more embodiments of the invention, the data register (102) provides data management services. Providing data management services may include: (i) managing the storage of data in the data storage (106), (ii) generating and/or storing records corresponding to data stored in the data storage (106), (iii) enabling any number of entities to ascertain information regarding the data stored in the data storage (106) using the generated and/or stored records, and/or (iv) managing the state of the components of the data register (102) in a manner that provides sufficient transactions per second to meet the demands of storing data in the data storage (106) while storing the records regarding the data stored in the data storage (106) in a manner that enables other entities to rely on the accuracy of the records.

In one or more embodiments of the invention, the data register (102) may manage the storage of data in the data storage (106) by assigning a portion (e.g., 102.2, 102.4) of the data register (102) to manage the storage of that data, Different portions of the data register (102) may be tasked with managing the storage of different data. By doing so, the tasks associated with storing data in the data storage (106) and/or generating corresponding records for the stored data may be distributed across the computing resources (i.e., the portions) of the data register (102).

Each of the portions (102.2, 102.4) of the data register (102) may include some of the computing resources of the data register (102). For example, the data register (102) may be implemented as an aggregation of physical computing devices and/or logical computing devices. Each portion of the data register (102) may include any number of the physical computing devices and/or logical computing devices. For additional details regarding the portions (102.2, 102.4) of the data register (102), refer to FIG. 1.2.

Data to be managed by the data register (102) may be assigned to a corresponding portion (102.2, 102.4) for management in any manner without departing from the invention. For example, when data is to be managed by the data register (102) the data register (102) may assign a particular portion to manage that data based on the current workloads for managing data assigned to each of the portions.

In another example, when data is to be managed by the data register (102), the data register may assign a particular portion to manage that data based on a relationship between an identifier of the data and the identifiers corresponding to each of the portions. In one or more embodiments of the invention, each of the physical and/or logical computing devices may be assigned an identifier of a particular length. The physical and/or logical computing devices may be divided into portions based on groupings of the identifiers (e.g., a first portion may include devices having identifiers 0-10, a second portion may include devices having identifiers 11-20, etc.). To determine which portion to assign to manage the data, a hash or other type of function of the identifier of the data may be generated to obtain a key having a length corresponding to the length of the identifiers of the devices of each of the portions. The portion that includes device identifiers in the range in which the key exists may be assigned to manage the data. Other methods of assigning portions to manage data may be used without departing from the invention.

In one or more embodiments of the invention, each of the devices of the portions (102.2, 102.4) of the data register (102) maintain at least two distributed data structures. The first distributed data structure may store information regarding the organization of the devices of the data register (102) into the portions (102.2, 102.4). The second distributed data structure may store records regarding data stored in the data storage (106). All of the devices of the data register (102) may maintain a copy of the first distributed data structure. Each of the portions may maintain separate, respective second distributed data structures. In other words, the content of the first distributed data structure may be the same across all of the devices of the data register (102) while the content of the second distributed data structure may only be similar across the devices of each of the portions (102.2, 102.4).

In one or more embodiments of the invention, the data register (102) generates and/or stores records corresponding to data stored in the data storage (106) by generating a key value pair for each stored data. The key value pair may include an identifier used by the data storage (106) in connection with the data. For example, the identifier may be the name of the file. The identifier may be usable to reference the data with the data storage (106).

The key value pair may also include a key, as discussed above. For example, the key may be a bit string of predetermined length generated using a hash or other type of function. The key may be used to select in which portion to store the record (i.e., the key value pair).

In one or more embodiments of the invention, the record is stored in a portion (e.g., 102.2, 102.4) corresponding to the key. As discussed above, each portion may correspond to a range of bit strings of the predetermined length. The portion corresponding to the range of bit strings to which the key resides may be selected as the storage location for the record.

In one or more embodiments of the invention, the record is stored in a distributed data structure that is unique to the portion in which the record is stored. For example, each of the portions may maintain separate distributed data structures for storing of records and/or other types of information. Consequently, only a portion of the devices of the data register (102) may participate in such storage. In contrast, all of the devices of the data register (102) may participate in the storage of another distributed data structure that includes information regarding which devices belong to which portion, the identifiers assigned to each device, and/or other information relevant to the operation of the data register (102).

In one or more embodiments of the invention, both of the aforementioned distributed data structures are immutable. For example, both of the aforementioned data structures may be implemented as block chains. However, because of the different numbers of participants and storing of the respective distributed data structures the transactions per second supported for each of the distributed data structures may be different. For example, the distributed data structure maintained by all of the devices of the data register (102) may have a smaller transactions per second rate than the distributed data structures maintained only by each of the respective portions (102.2, 102.4) rather than all of the devices of the data register (102).

The distributed data structure maintained by all of the devices of the data register (102) may be referred to as a main chain. For additional details regarding the main chain, refer to FIG. 2.1. The distributed data structures maintained by each of the respective portions of the data register may be referred to as secondary chains. For additional details regarding the secondary chains, refer to FIG. 2.1.

In one or more embodiments of the invention, the data register (102) enables any number of entities to ascertain information regarding the data stored in the data storage (106) using the generated and/or stored records. As discussed above, such records may be stored as part of a distributed data structure. To ascertain information regarding the data stored in the data storage (106), the entities may send a request for such information to any of the devices of the data register (102). The devices may cooperatively respond to such request for information by providing the requested information that is stored in a secondary chain, as discussed above.

In one or more embodiments of the invention, the data register (102) manages the state of the components of the data register (102) in a manner that provides sufficient transactions per second to meet the demands of storing data in the data storage (106) while storing the records regarding the data stored in the data storage (106) in a manner that enables other entities to rely on the accuracy of the records. To do so, the data register (102) may control the number of devices assigned to any of the respective portions within predetermined limits.

In one or more embodiments of the invention, each of the portions includes a minimum of N devices. N may be selected based on the type of distributed data structure used to store records regarding data stored in the data storage, the algorithms used to manage the distributed data structure, and/or other factors.

For example, N may be selected to ensure that it is likely that data appended to a secondary chain is accurate. By increasing the number N of devices assigned to a portion, the likelihood of inaccurate information being added to a secondary chain may decrease. However, the transactions per second supported by the portion corresponding to the secondary chain may decrease. Consequently, it may not be desirable to increase the number of devices N beyond that required to make it unlikely that inaccurate information may be appended to the secondary chain.

In one or more embodiments of the invention, each of the portions includes a maximum of 2*N+X devices. X may be selected based on the type of distributed data structure used to store records regarding data stored in the data storage, the algorithms used to manage the distributed data structure, and/or other factors.

In one or more embodiments of the invention, the data register (102) includes functionality to merge and/or divide portions to meet the requirements, discussed above, with respect to the minimum and/or maximum number of devices that may be included in each of the portions. The data register (102) may monitor the number devices in each of the portions and take action when one of the portions includes a number of devices above or below the maximum or minimum number of devices. By doing so, the data register (102) may improve the likelihood that data included in the secondary chains is accurate while also providing appropriate levels of transactions per second.

The data storage (106) may be implemented using computing devices. The computing devices may be, for example, embedded computing devices, mobile phones, tablet computers, laptop computers, desktop computers, servers, network devices, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3.1-4.3. The data storage (106) may be other types of computing devices without departing from the invention. For additional details regarding computing devices, refer to FIG. 6.

The data storage (106) may be implemented using logical devices without departing from the invention. For example, the data storage (106) may be implemented as virtual machines or other types of logical entities that utilize computing resources of any number of physical computing devices to provide the functionality of the data storage (106). The data storage (106) may be other types of logical devices without departing from the invention.

In one or more embodiments of the invention, the data storage (106) provides data management services, Data management services may include storing of data and providing stored data. The data storage (106) may provide such services for any type and/or quantity of data.

In one or more embodiments of the invention, data stored in the data storage (106) is registered. That is, the data may be indexed or otherwise associated with registration records. The data may be registered with, for example, a corresponding portion (e.g., 102.2, 102.4) of the data register (102), as discussed above. To register the data, the data storage (106) may provide an identifier associated with the data to any of the devices of the data register (102). The device may determine an appropriate portion for registering the data and provide the information obtained from the data storage (106) regarding the data to one or more devices of the appropriate portion (e.g., 102.2, 102.4).

While the system of FIG. 1.1 has been illustrated and described as including a limited number of specific components, a system in accordance with one or more embodiments of the invention may include additional, fewer, and/or different components without departing from the invention.

As discussed above, portions of the data register (102) of the system of FIG. 1.1 may be implemented using physical and/or logical computing devices. FIG. 1.2 shows a diagram of an example portion (110) in accordance with one or more embodiments of the invention.

The example portion (110) may include any number of physical or logical computing devices (e.g., 110.2, 110.4). The aforementioned physical and/or logical devices may cooperatively perform one or more functionalities of each respective portion. For example, the physical/logical computing devices may be programmed to implement a first distributed data structure that is also maintained by other portions and a second distributed data structure that is only maintained by the physical/logical computing devices of the example portion (110). The distributed data structures may be, for example, block chains that include immutable data. The distributed data structures may be other types of data structures without departing from the invention.

To implement the distributed data structure, all or a portion of the physical/logical computing devices (110.2, 110.4) may host applications that control when data is added to the distributed data structures.

Additionally, the aforementioned devices may implement an algorithm for generation the distributed data structures in a manner that enables other entities to of rely on the accuracy of the information included in the distributed data structures. For example, the aforementioned devices of the example portion (110) implement one or more components of a block chain algorithm that includes "show your work information" in the block chain. The show your work information included in the block chain may enable any entity to rely on the accuracy by being able to determine that the information included in the distributed data structures is accurate. For additional details regarding block chains, refer to FIGS. 2.1-2.2.

In one or more embodiments of the invention, at any time, any number of physical/logical computing devices may be added or removed from the example portion (110). For example, a failed physical computing device may be removed from the example portion (110). In another example, the functionality of a physical computing device may be modified such that it no longer properly performs the functionality of the example portion (110). In such a scenario, the modified physical computing device may be removed from the example portion (110).

The physical/logical computing devices (110.2, 110.4) may be similar to that illustrated in FIG. 1.3. FIG. 1.3 shows a diagram of an example physical/logical computing device (120) in accordance with one or more embodiments of the invention. To provide the functionality of the physical/logical computing devices discussed above, the example physical/logical computing device (120) may include a computing device manager (122) and/or persistent storage (124) that stores data structures that may be used by the computing device manager (122).

The computing device manager (122) may manage the operation of the example physical/logical computing device (120). The computing device manager (122) may be implemented using any combination of physical hardware and/or logically executing entities that utilize the computing resources of any quantity of physical hardware to support its execution.

In one or more embodiments of the invention, the computing device manager (122) includes functionality to manage block chain type data structures and/or other types of distributed trusted data structures. For example, the computing device manager (122) may be programmed to decide when to append information to the main chain instance (128) and a secondary chain instance (130) in cooperation with other physical/logical computing devices of a portion and/or all of the other physical logical computing devices of a data register.

For example, the computing device manager (122) may decide when and the contents of data to append to the main chain instance (128) in cooperation with all of the other physical/logical computing devices of the data register. In contrast, the computing device manager (122) may decide when the contents of data to append to the secondary chain instance (130) in cooperation with only other physical/logical computing devices of a portion of the data register to which the example physical/logical computing device (120) is assigned. By doing so, the computational cost for appending data to each of the respective chain instances (e.g., 128, 130) may be different. Specifically, the computational cost for appending data to the secondary chain instance (130) may be less than the computational cost for appending data to the main chain instance (128).

Additionally, the computing device manager (122) may include functionality to service requests directed towards a data register of which the example physical/logical computing device (120) is a member. To service requests, the computing device manager (122) may (i) determine which portion of the data register should service any particular request and (ii) forward that request to a physical/logical computing device of the determined portion of the data register. To make such determinations, as discussed above, the computing device manager (122) may utilize information included in the main chain instance (128). If the example physical/logical computing device (120) is to service received request, the computing device manager (122) may service the request by, for example, storing a record of data stored in data storage of the data register and the secondary chain instance (130) after consultation with other physical/logical computing devices of the portion of the data register to which the example physical/logical computing device (120) is a member.

The persistent storage (124) may provide data storage services to the computing device manager (122). The persistent storage (124) may be implemented using any combination of physical hardware and/or logical hardware that utilize the computing resources of any quantity of physical hardware to support its functionality. For example, the persistent storage (124) may include any combination of hard disk drives, solid state drives, tape drives, and/or any other type of physical hardware device for storing data. In another example, the persistent storage (124) may include a logical device that provides storage resources by using the physical data storage resources of any combination of hard disk drives, solid state drives, tape drives, and/or any other type of physical hardware device for storing data.

In one or more embodiments of the invention, the persistent storage (124) stores a computing device identifier (126), the main chain instance (128), and a secondary chain instance (130). Each of these data structures are discussed below.

The computing device identifier (126) may be a data structure that includes information regarding an identifier assigned to the example physical/logical computing device (120). The computing device identifier (126) may be, for example, a bit string of a predetermined length. Each example physical/logical computing device (120) of a data register in accordance with embodiments of the invention may include a computing device identifier (126).

The main chain instance (128) may be a data structure that includes information regarding the organization of devices of the data register. For example, the main chain instance (128) may include information regarding which physical/logical computing devices belong to the respective portions of the data register. For additional details regarding main chains, refer to FIG. 2.1.

The secondary chain instance (130) may be a data structure that includes information regarding data stored in data storage of the data register. For example, the secondary chain instance (130) may include records of a portion of the data stored in the data storage of the data register. Different instances of the secondary chain may include records for different portions of the data stored in the data storage of the data register.

While the data structures of FIG. 1.3 have been illustrated and described as including a limited amount of specific information, the aforementioned data structures may include additional, different, and/or less information without departing from the invention. Additionally, the aforementioned data structures may be broken down into any number of data structures, may be combined with other data structures that include different types of information, may have different structures than that illustrated in FIG. 1.3, and/or may be spanned across any number of persistent storages without departing from the invention.

As discussed above, one or more embodiments of the invention may utilize one or more distributed data structures to support the operation of the system of FIG. 1.1. FIGS. 2.1-2.2 show data structures that may be utilized by the system of FIG. 1.1 in accordance with one or more embodiments of the invention. As discussed above, the distributed data structures may be implemented as block chain type data structures as illustrated in FIGS. 2.1-2.2. However, the distributed data structures may be implemented using other data structure topologies without departing from the invention.

FIG. 2.1 shows a diagram of an example main chain (200) in accordance with one or more embodiments of the invention. The example main chain (200) may be a data structure used by components of the system of FIG. 1.1. For example, the devices of the data register may manage, generate, and/or otherwise utilize a data structure similar to the example main chain (200).

The example main chain (200) may be implemented as a block chain that includes "show your work information" that enables other entities to trust the accuracy of information included in the example main chain (200). For example, the "show your work information" may be proof of work or other types of proof information. While such information is not illustrated in FIG. 2.1, the example main chain (200) may include such information to enable other entities to rely on the accuracy of the information included in the example main chain (200).

In one or more embodiments of the invention, the example main chain (200) includes any number of blocks (not shown) that store different portions of the computing device identifier repository (202) and/or the portions map (204). The blocks may include additional, different, and/or less data without departing from the invention.

The computing device identifier repository (202) may include information regarding the identifiers assigned to each of the computing devices. As noted above, each of the devices of the data register may be assigned an identifier. All of the identifiers may be, for example, bit strings of a similar length. Identifiers may be other types of data structures without departing from the invention.

The portions map (204) may include information regarding the devices of the data register that belong to each of the portions of the data register. For example, the portions map (204) may specify ranges of identifier values that are associated with each of the respective portions. As discussed above, the portions map (204) may be used to determine which portion of the data register is to service any particular data storage request and/or other type of request.

FIG. 2.2 shows a diagram of an example secondary chain (210) in accordance with one or more embodiments of the invention. The example secondary chain (210) may be a data structure used by components of the system of FIG. 1.1. For example, the devices of each portion of the data register may manage, generate, and/or otherwise utilize a data structure similar to the example secondary chain (210).

The example secondary chain (210) may be implemented as a block chain that includes "show your work information" that enables other entities to trust the accuracy of information included in the example secondary chain (210). For example, the "show your work information" may be proof of work or other types of proof information. While such information is not illustrated in FIG. 2.2, the example secondary chain (210) may include such information to enable other entities to rely on the accuracy of the information included in the example secondary chain (210).

In one or more embodiments of the invention, the example secondary chain (210) includes any number of blocks (not shown) that store different portions of data registration records (e.g., 212, 214). Any number of such records may be stored in any number of blocks. The blocks may include additional, different, and/or less data without departing from the invention.

As discussed above, the data registration records (212, 214) may reflect data stored in data storage of the data register. For example, the data registration records (212, 214) may include records reflecting a portion of the data in the data storages that maps (via a hash or other type of function) to an identifier range associated with the example secondary chain (210) (i.e., a range of identifiers of the devices that manage the example secondary chain (210)).

While the data structures of FIGS. 2.1-2.2 have been illustrated and described as including a limited amount of specific information, the aforementioned data structures may include additional, different, and/or less information without departing from the invention. Additionally, the aforementioned data structures may be broken down into any number of data structures, may be combined with other data structures that include different types of information, may have different structures than that illustrated in FIGS. 2.1-2.2, and/or may be spanned across any number of persistent storages without departing from the invention.

Returning to FIG. 1.1, the data register (102) may manage data for any number of entities. FIGS. 3.1-3.3 show diagrams of methods that may be performed when the data register (102) manages data and FIGS. 4.1-4.3 shows diagrams of methods that may be performed to manage the devices of the data register while the data register provides data management services.

FIG. 3.1 shows a flowchart of a method in accordance with one or more embodiments of the invention. The method depicted in FIG. 3.1 may be used to direct a registration request to an appropriate portion for registration purposes in accordance with one or more embodiments of the invention. The method shown in FIG. 3.1 may be performed by, for example, a device of a data register 102, FIG. 1.1). Other components of the system illustrated in FIG. 1.1 may perform all, or a portion, of the method of FIG. 3.1 without departing from the invention.

While FIG. 3.1 is illustrated as a series of steps, any of the steps may be omitted, performed in a different order, additional steps may be included, and/or any or all of the steps may be performed in a parallel and/or partially overlapping manner without departing from the invention.

In step 300, the data registration request for data is obtained.

In one or more embodiments of the invention, the data registration request is obtained from a data provider. The data registration request may request that data be managed by the data register.

In one or more embodiments of the invention, the data registration request specifies an identifier for the data. For example, identifier for the data may be a file name. Identifier for the data may be other types of information without departing from the invention.

In step 302, a key for the data is generated.

In one or more embodiments of the invention, the key is a data structure that may be used by devices of the data register to determine which portion of the data register will be responsible for managing the data. For example, the key may be a bit string that is the same size as bit strings used as identifiers of devices of the data register.

In step 304, the key and/or storage information for the data are provided to a computing device of a portion based on the key.

As discussed above, different portions may be associated with different identifier ranges. The key may fall into one of the identifier ranges. The portion associated with the identifier range in which it falls may be provided with the key and/or the storage information.

The method may end following step 304.

Thus, via the method illustrated in FIG. 3.1, different requests for data registrations may be appropriately distributed to different portions of the data register for servicing.

FIG. 3.2 shows a flowchart of a method in accordance with one or more embodiments of the invention. The method depicted in FIG. 3.2 may be used to register data in accordance with one or more embodiments of the invention. The method shown in FIG. 3.1 may be performed by, for example, a device of a data register (e.g., 102, FIG. 1.1). Other components of the system illustrated in FIG. 1.1 may perform all, or a portion, of the method of FIG. 3.2 without departing from the invention.

While FIG. 3.2 is illustrated as a series of steps, any of the steps may be omitted, performed in a different order, additional steps may be included, and/or any or all of the steps may be performed in a parallel and/or partially overlapping manner without departing from the invention.

In step 310, the key and/or storage information for data is obtained.

The key and/or storage information may be obtained from another device of the data register. The another device of the data register may provide the key and/or the storage information using the method illustrated in FIG. 3.1.

In step 322, a secondary chain is updated based on the key and/or the storage information.

In one or more embodiments of the invention, the secondary chain is updated by appending information corresponding to the key and/or the storage information. For example, the key and/or the storage information may be appended to a record in a block to the secondary chain.

In one or more embodiments of the invention, the secondary chain is only updated consensus regarding the accuracy of the key and/or the storage information is reached in cooperation with other devices of a portion to which the device that obtained the key and/or the storage information belongs. For example, as discussed above, each of the devices of a portion may only append information to the secondary chain if a consensus regarding the accuracy of the information is reached. If consensus regarding the accuracy of the key and/or the storage information is reached that indicates that the aforementioned information is inaccurate, the secondary chain may not be updated.

The method may end following step 322.

FIG. 3.3 shows a flowchart of a method in accordance with one or more embodiments of the invention. The method depicted in FIG. 3.3 may be used to obtain access to registered data in accordance with one or more embodiments of the invention. The method shown in FIG. 3.3 may be performed by, for example, a device of a data register (e.g., 102 FIG. 1.1), Other components of the system illustrated in FIG. 1.1 may perform all, or a portion, of the method of FIG. 3.3 without departing from the invention.

While FIG. 3.3 is illustrated as a series of steps, any of the steps may be omitted, performed in a different order, additional steps may be included, and/or any or all of the steps may be performed in a parallel and/or partially overlapping manner without departing from the invention.

In step 320, the key for data registered in a secondary chain is obtained.

In one or more embodiments of the invention, the key is obtained from a record stored in the secondary chain. Record may be registration for the data. The data may be stored in data storage of the data register and/or other locations.

In step 322, a request for storage information for the data is sent to a computing device of a portion based on the key.

As discussed above, different keys may be associated with different portions. The associations may be specified by a main chain. A copy of the main chain may be stored in each of the devices of the data register. Consequently, any device storing a copy of the main chain may be able to provide information regarding the portion that is based on the key.

In step 324, the storage information is obtained for the data from the portion. For example, a device of the portion that received the request in step 322 may provide the storage information in response to the request. The storage information may include, for example, the name of the file upon which the key was based.

In step 326, the data is obtained using the storage information.

In one or more embodiments of the invention, the data is obtained by sending a request to a data storage for the data. The request may include storage information. The data storage may provide the data in response to receiving the request that includes the storage information. For example, the storage information may be the name or other identifier used to reference the data.

The method may end following step 326.

As discussed above, in addition to managing data, the data register may manage its devices to ensure that accuracy of data included in the data register as well as provide a sufficient transaction rate necessary to meet the data storage/registration demands of a system. FIGS. 4.1-4.3 show diagrams of methods that may be performed by the data register to manage its operation.

FIG. 4.1 shows a flowchart of a method in accordance with one or more embodiments of the invention. The method depicted in FIG. 4.1 may be used to manage the number of devices assigned to each portion of a data register in accordance with one or more embodiments of the invention. The method shown in FIG. 4.1 may be performed by, for example, a device of a data register (e.g., 102, FIG. 1.1). Other components of the system illustrated in FIG. 1.1 may perform all, or a portion, of the method of FIG. 4.1 without departing from the invention.

While FIG. 4.1 is illustrated as a series of steps, any of the steps may be omitted, performed in a different order, additional steps may be included, and/or any or all of the steps may be performed in a parallel and/or partially overlapping manner without departing from the invention.

In step 400, a size of each portion is monitored.

In one or more embodiments of the invention, the size of each portion is monitored by updating information included in the main chain regarding the devices assigned to each portion of the data register. For example, as devices are removed and/or added to different portions of the data register, the corresponding identifiers and/or descriptions of the devices assigned to each portion may be updated.

In step 402, it is determined whether the size of any portion meets first criteria.

In one or more embodiments of the invention, the first criteria include a minimum size for each of the portions. That is, whether any of the portions include fewer devices than the minimum size. The first criteria may include other and/or different requirements without departing from the invention.

If it is determined that any of the portions meet the first criteria, the method may proceed to step 406. If none of the portions meet the first criteria, the method may proceed to step 404.

In step 404, it is determined whether the size of any portion meets second criteria.

In one or more embodiments of the invention, the second criteria include the maximum size for each of the portions. That is, whether any of the portions include more devices than the maximum size. The second criteria may include other and/or different requirements without departing from the invention.

If it is determined that none of the portions meet the second criteria, the method may end following step 404. If it is determined that any of the portions meet the second criteria, the method may proceed to step 408.

Returning to step 402, the method may proceed to step 406 following step 402 it is determined that any size of a portion meets the first criteria.

In step 406, a first action set to merge two portions is performed.

In one or more embodiments of the invention, the first action set includes combining the devices of two portions into a single combined portion. When combining the two portions, the secondary chains of each of the portions may be merged to include all of the data registrations included in each of the secondary chains and a single merged secondary chain. For example, the blocks in each of the secondary chains may be modified to both point towards new blocks added after the marriage, Refer to FIG. 5.5 for an illustration of two merged secondary chains.

In one or more embodiments of the invention, the first action set includes modifying the main chain to reflect the new membership with respect to the now single combined portion. For example, the portion map may be updated to reflect the single combined portion. When updating the portion map, the portion map may specify that the identifier ranges associated with the devices of the two portions prior to merge are now associated with that single combined portion.

In one or more embodiments of the invention, the first action set is performed via the method illustrated in FIG. 4.2. The first action set may be performed via other methods without departing from the invention.

The method may end following step 406.

Returning to step 404, the method may proceed to step 408 following step 404 if the size of a portion meets the second criteria.

In step 408, a second action set is performed to subdivide a first portion into two portions.

In one or more embodiments of the invention, the second action set includes dividing the devices of the first portion into the two portions. When dividing the first portion, duplicate copies of the secondary chain of the first portion may be included in each of the two portions after the division of the first portion. For example, the blocks in each of the secondary chains of the two portions may reflect those included in the first portion until the point in time of the division. Following the point in time of the division, the secondary chains maintained by each of the two portions may be different. Refer to FIG. 5.8 for an illustration of a portion after division.

In one or more embodiments of the invention, the second action set includes modifying the main chain to reflect the new membership with respect to the now divided first portion into two portions. For example, the portion map may be updated to reflect the two portions. When updating the portion map, the portion map may specify that the identifier range associated with the devices of the first portion, prior to division, are now divided between two different portions.

The method may end following step 408.

FIG. 4.2 shows a flowchart of a method in accordance with one or more embodiments of the invention. The method depicted in FIG. 4.2 may be used to merge two portions in accordance with one or more embodiments of the invention. The method shown in FIG. 4.2 may be performed by, for example, a device of a data register (e.g., 102, FIG. 1.1). Other components of the system illustrated in FIG. 1.1 may perform all, or a portion, of the method of FIG. 4.2 without departing from the invention.

While FIG. 4.2 is illustrated as a series of steps, any of the steps may be omitted, performed in a different order, additional steps may be included, and/or any or all of the steps may be performed in a parallel and/or partially overlapping manner without departing from the invention.

In step 410, computing devices of a second portion are reassigned to a first portion. The reassignment may be performed by modifying the main chain that includes a portion map that defines the assignments of devices to the different portions of the data register. For example, the main chain may be updated to reflect that the identifier ranges associated with the second portion are now associated with the first portion.

In step 412, a secondary chain of the second portion is merged with a secondary chain of the first portion.

In one or more embodiments of the invention, the secondary chain of the second portion is merged with a secondary chain of the first portion by adding pointers to that are directed towards the block added after the merge to the secondary chain. For example, the blocks of both secondary chains may be linked with the first newly added block after the merge. By doing so, the devices reassigned to the first portion include information necessary to access the data registrations that were present in the secondary chain of the second portion prior to the merge.

In one or more embodiments of the invention, information regarding sub identifier ranges associated with each of the secondary chains, prior to the merge of step 412, is added to the first block of the secondary chain of the first portion after the merge. The aforementioned information may be utilized to read appropriate data registrations from both of the now merged secondary chains.

The method may end following step 412.

FIG. 4.3 shows a flowchart of a method in accordance with one or more embodiments of the invention. The method depicted in FIG. 4.3 may be used to subdivide a portion into two portions in accordance with one or more embodiments of the invention. The method shown in FIG. 4.3 may be performed by, for example, a device of a data register 102, FIG. 1.1). Other components of the system illustrated in FIG. 1.1 may perform all, or a portion, of the method of FIG. 4.3 without departing from the invention.

While FIG. 4.3 is illustrated as a series of steps, any of the steps may be omitted, performed in a different order, additional steps may be included, and/or any or all of the steps may be performed in a parallel and/or partially overlapping manner without departing from the invention.

In step 420, a set of computing devices of the portion are reassigned to a new portion.

In one or more embodiments of the invention, the set of computing devices of the portion are reassigned to the new portion by updating a main chain to reflect the assignment. For example, a portion map included in the main chain may be updated to reflect that the sub range of identifiers of devices of the portion are now associated with the new portion.

In step 422, a new secondary chain for the new portion is generated based on the secondary chain associated with the portion. In other words, when devices of the portion are assigned to the new portion, the new secondary chain maintained by the devices of the new chain may include a duplicate copy of the secondary chain associated with the portion up until the reassignment. After reassignment, new blocks may be appended to the copy of the secondary chain that are different from new blocks added to the secondary chain associated with the portion.

The method may end following Step 422.

Thus, via the methods illustrated in FIGS. 4.1-4.3, the number of devices assigned to each portion may be dynamically modified to meet data accuracy requirements as well as transaction rate requirements by ensuring a minimum number of devices are assigned to each portion while preventing the number of devices assigned to each portion from exceeding a maximum number.

To further clarify embodiments of the invention, a non-limiting example is provided in FIGS. 5.1-5.8. FIG. 5.1 may illustrate a diagram of a system similar to that of FIG. 1.1 and FIGS. 5.2-5.8 may show diagrams of data structures of the system of FIG. 5.1 at different points in time. For the sake of brevity, only a limited number of components and/or associated data structures of the system of FIG. 1.1 are illustrated in each of FIGS. 5.1-5.8.

EXAMPLE

Consider a scenario as illustrated in FIG. 5.1 in which a temperature sensor (500) is providing data to a data register (502) for storage in data storage (106). Over time, the temperature sensor (500) may provide temperature sensor readings for the data register to manage.

At a first point in time the data register (502) may include 1000 devices divided into six portions. At the first point in time, portion A (510) may be assigned 150 devices as illustrated in FIG. 5.2. Similarly, portion B (512) may be assigned 150 devices.

At a second point in time, as illustrated in FIG. 5.3, 110 of the devices assigned to portion A (510) become unavailable resulting in only 40 devices being assigned to portion A (510). Because of the small number of devices assigned to portion A (510), the data register determines that portion A (510) should be merged with portion B (512) so that portion A (510) does not continue to operate with a number of devices below a first criteria.

In response to the determination, the data register merges portions A and B as illustrated in FIG. 5.4. Specifically, portions A and B are combined into a single portion as merged portions A and B (514). After the merging, the merged portions A and B (514) are assigned a total of 190 devices which no longer meets the criteria for merging of a portion with a second portion.

As part of the merge, the secondary chains associated with portions A and B are merged as illustrated in FIG. 5.5. Specifically, the first block added after the merge, e.g., the merged portions A & B secondary chain block 1 (540), includes pointers (as indicated by the arrows included in the figure) to both of the portion A secondary chain block N (522) (i.e., the last block added to the secondary chain associated with portion A prior to the merge) and the portion B secondary chain block M (532) (i.e., the last block added to the secondary chain associated with portion B prior to the merge). In the state illustrated in FIG. 5.5, both secondary chains prior to merging may be accessed using the pointers associated with the merged portions A & B secondary chain block 1 (540) that is appended after the merge.

At a third point in time, as illustrated in FIG. 5.6, the number of devices assigned to portion C (516) is increased to 300 devices. In response to the increase in the number of devices assigned to portion C, the data register determines that portion C (516) should be divided into two portions because the computational expense for maintaining a secondary chain associated with portion C (516) is too large due to the increased computation cost for cooperatively managing a block chain by that number of devices. Specifically, the data register makes the aforementioned determination by comparing the number of devices assigned to portion C (516) to second criteria that defines that maximum number of devices that may be assigned to any portion.

In response to the determination, the data register generates a new portion (518) as illustrated in FIG. 5.7 and reassigns 150 devices from portion C (516) to the new portion (518). By reassigning 150 of the devices to the new portion (518), the computational cost for maintaining the secondary chain associated with portion C (516) may be decreased resulting in the ability for additional transactions per second completed.

To begin operation of the new portion (518), a new secondary chain for the new portion (518) is generated as illustrated in FIG. 5.8. As seen from FIG. 5.8, a portion of the blocks (e.g., 560, 562) of the new secondary chain (519) are the same as those included in the secondary chain associated with portion C prior to the division. The portion of the blocks (e.g., 564, 566) of the new secondary chain (519) is different from those included in the secondary chain associated with portion C following the division.

End of Example

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

Embodiments of the invention may provide methods, devices, and/or systems for managing data. Specifically, embodiments of the invention may provide a method for managing data in a trusted manner in an environment in which devices that manage the data are joining and leaving the data management system. By doing so, embodiments of the invention may provide a system that improves the likelihood that the managed data is both accurate data and that the system is able to meet the data registration demands imposed on it by users of its services. To do so, the system may utilize multiple block chain like data structures with different number of entities participating in the management of the respective chains.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A physical computing device of a data register, comprising:

Physical persistent storage for storing:
an instance of a primary chain that specifies an organizational structure of a plurality of computing devices organized into a plurality of portions of computing devices, wherein the plurality of computing devices is separate from the computing device of the data register and the persistent storage, and wherein a total amount of the plurality of computing devices is not constant and dynamically changes, wherein each of the computing devices is associated with an identifier value, wherein the primary chain comprises a portions map and a computing device identifier repository, wherein the portions map specifies a range of identifier values associated with each of the plurality of portions of computing devices and wherein the computing device identifier repository specifies identifier values for each of the computing devices registered on the primary chain, and wherein the portions map and the computing device identifier repository are used to service requests for data stored on the plurality of computing devices; and a secondary chain for registering data associated with a first portion of the plurality of portions of computing devices that is less than all of the plurality of computing devices and includes at least one key providing access to a portion of data corresponding to data associated with the first portion of the plurality of portions of computing devices;

a data register manager programmed to:
monitor sizes of each of the plurality of portions of computing devices specified by the organizational structure, wherein the size of each of the plurality of portions of computing devices corresponds to a number of computing devices assigned to each of the plurality of portions of computing devices and wherein the size of each of the plurality of portions of computing devices may dynamically change based on computing devices being added or removed from each of the plurality of portions of computing devices;

make a determination, based on the monitoring, that the organizational structure fails to meet at least one criteria; and in response to the determination:
reorganize the organizational structure to meet the at least one criteria when the amount of the plurality of computing devices changes, by, at least in part, modifying the plurality of portions of computing devices and modifying the primary and the secondary chains to reflect the change in the plurality of portions of computing devices; and wherein each of the plurality of portions of computing devices is associated with a different secondary chain, and wherein reorganizing the organizational structure to meet the at least one criteria comprises performing at least one of:
merging the first portion of the plurality of portions of computing devices and a second portion of the plurality of portions of computing devices; and dividing the first portion of the plurality of portions of computing devices into two portions of the plurality of portions of computing devices wherein each of the plurality of computing devices is operatively connected to the data register via a network.

2. The computing device of claim 1, wherein merging the first portion of the plurality of portions of computing devices and the second portion of the plurality of portions of computing devices comprises:

reassigning a set of computing devices assigned to the second portion of the plurality of portions of computing devices to the first portion of the plurality of portions of computing devices; and merging a secondary chain associated with the second portion of the plurality of portions of computing devices with the secondary chain associated with the first portion of the plurality of portions of computing devices.

3. The computing device of claim 1, wherein dividing the first portion of the plurality of portions of computing devices into two portions of the plurality of portions of computing devices comprises:

reassigning a subset of a set of computing devices of the plurality of computing devices from the first portion of the plurality of portions of computing devices to a new portion of the two portions of the plurality of portions of computing devices; and generating a new secondary chain for the new portion of the two portions of the plurality of portions of computing devices based on the secondary chain associated with the first portion of the plurality of portions of computing devices.

4. The computing device of claim 1, wherein the organizational structure specifies logical divisions of the computing devices into the plurality of portions of computing devices.

5. The computing device of claim 1, wherein the plurality of computing devices of each of the portions of the plurality of portions of computing devices store a respective secondary chain.

6. The computing device of claim 5, wherein each of the respective secondary chains store data registrations.

7. The computing device of claim 1, wherein the size of each of the portions of the plurality of computing devices corresponds to a number of computing devices associated with each of the portions of the plurality of computing devices.

8. The computing device of claim 1, wherein the at least one criteria is a minimum size of each of the portions of the plurality of computing devices.

9. The computing device of claim 8, wherein the at least one criteria is a maximum size of each of the portions of the plurality of computing devices.

10. The computing device of claim 9, wherein the maximum size is at least double the minimum size.

* * * * *